United States Patent
Soeda et al.

(10) Patent No.: US 6,403,695 B1
(45) Date of Patent: Jun. 11, 2002

(54) CARBON BLACK AND RUBBER COMPOSITIONS CONTAINING SAME

(75) Inventors: Mizuo Soeda, Tokyo; Akimasa Arita, Kanagawa-ken; Takeo Ito; Kazue Watanabe, both of Chiba-Ken, all of (JP)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 08/160,324

(22) Filed: Dec. 2, 1993

Related U.S. Application Data

(63) Continuation of application No. 07/941,124, filed as application No. PCT/US91/03115 on May 7, 1991, now abandoned.

(30) Foreign Application Priority Data

May 8, 1990 (JP) .............................................. 2-119577

(51) Int. Cl.[7] .............................................. C09C 1/50
(52) U.S. Cl. ..................... 524/495; 423/449.1
(58) Field of Search ........................ 524/495; 423/449.1

(56) References Cited

U.S. PATENT DOCUMENTS

| 3,922,335 | A | * | 11/1975 | Jordan et al. ................ 423/450 |
| 3,952,087 | A |   | 4/1976  | Antonsen et al. ........... 423/450 |
| 4,548,980 | A | * | 10/1985 | Nagata et al. ........... 423/449.1 |
| 4,784,695 | A |   | 11/1988 | Mito et al. .................. 106/472 |
| 4,822,844 | A |   | 4/1989  | Kawakami et al. ......... 524/496 |
| 4,933,107 | A |   | 6/1990  | Watanabe et al. ........... 252/511 |

FOREIGN PATENT DOCUMENTS

| JP | 5986663  | 5/1984 | ............. C09C/1/50 |
| JP | 5947263  | 3/1986 | ............. C09C/1/48 |
| JP | 2103268  | 4/1990 | ............. C09C/1/48 |
| NL | 7508808  | 1/1976 | ............. C09C/1/50 |

* cited by examiner

Primary Examiner—Stuart L. Hendrickson

(57) ABSTRACT

Novel carbon blacks having a CTAB of from 65 m$^2$/g to 85 m$^2$/g, a DBP of from 130 cc/100 g to 160 cc/100 g, a CTAB/I$_2$ No. ratio of from 1.15 to 1.35, a ΔDPB of from 20 cc/100 g to 40 cc/100 g, a Tint value of from 85 to 100, a Dmode of from 115 nm to 135 nm and a ΔD$_{50}$/Dmode ratio of from 0.65 to 0.90. Also disclosed are novel rubber compositions, incorporating the carbon blacks, having increased abrasion resistance and lower hysteresis.

2 Claims, 2 Drawing Sheets

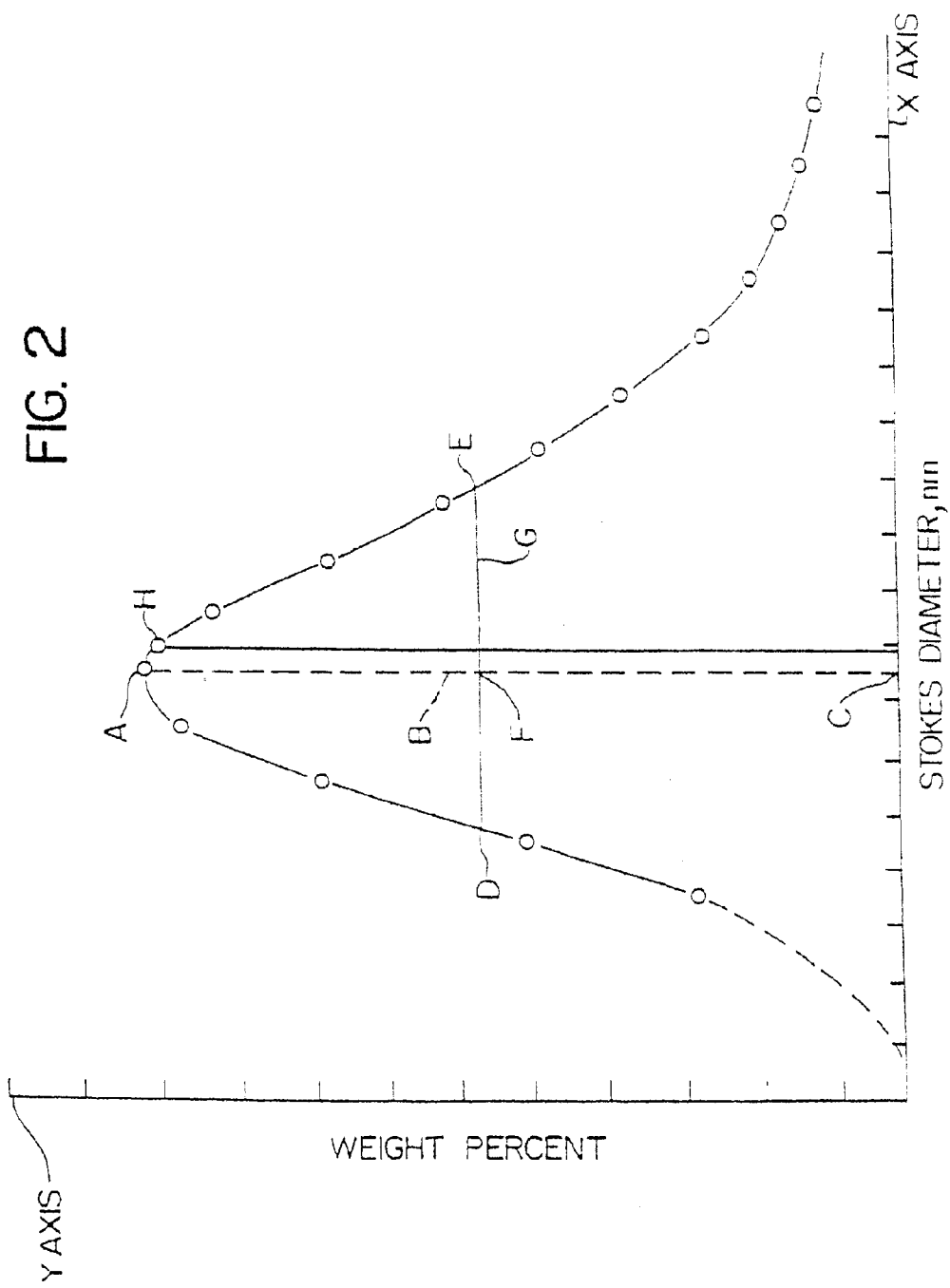

CARBON BLACK AND RUBBER COMPOSITIONS CONTAINING SAME

This application is a continuation of application Ser. No. 07/941,124, filed Oct. 30, 1992, now abandoned, and is a National Stage application of PCT/US91/03115 filed May 7, 1991.

FIELD OF THE INVENTION

The present invention relates to a class of new and novel furnace carbon blacks which are suitable for various applications and particularly well suited for use in rubber compositions. The carbon blacks of the present invention impart improved hysteresis loss and abrasion resistance to rubber compositions, particularly passenger car tires, in which they are incorporated.

BACKGROUND

Carbon blacks are generally produced in a furnace-type reactor by pyrolyzing a hydrocarbon feedstock with hot combustion gases to produce combustion products containing particulate carbon black.

Carbon blacks may be utilized as pigments, fillers, reinforcing agents and for a variety of other applications. For example, carbon blacks are widely utilized as fillers and reinforcing pigments in the compounding and preparation of rubber compositions.

Carbon blacks for rubber use have a variety of grades depending upon their properties and are generally classified on the basis of analytical properties including: surface area, structure (DBP absorption) and the like. Methods of measuring the surface area of carbon black include an electron microscope, nitrogen surface area ($N_2SA$) according to the BET method, CTAB surface area according to the adsorption of cetyltrimethylammonium bromide as a surfactant, and iodine adsorption number ($I_2$ No.). The structure of a carbon black refers to the linkage of carbon black particles due to agglomeration. As the degree of agglomeration becomes greater, the value of this structure becomes higher.

The properties of the grade of carbon black become an important factor in determining various performances of the rubber composition wherein the carbon blacks are incorporated. Carbon blacks are effective in the preparation of rubber vulcanizates intended for usage in preparing tires. It is generally desirable in the production of tires to utilize carbon blacks which impart high levels of abrasion resistance and low levels of rolling resistance to the tires.

The grade of the carbon black used mainly for tire treads is classified into HAF (high abrasion furnace), ISAF (intermediate super abrasion furnace) and SAF (super abrasion furnace) with SAF carbon black having a higher surface area than ISAF carbon black which has a higher surface area than HAF carbon black. Abrasion resistance generally improves as surface area increases.

The properties of the grade of carbon black become an important factor in determining various performances of the rubber composition wherein the carbon blacks are incorporated. Generally, carbon blacks having a specific surface area higher than ISAF are used for tire treads of trucks and buses wherein natural rubber is used as a main component. HAF type carbon blacks are used for passenger car tire treads wherein synthetic rubbers such as styrene butadiene rubber (SBR) are used as a main component.

Higher surface area carbon blacks impart improved abrasion resistance to tires. However, as specific surface area becomes larger, heat build-up of the rubber compound becomes higher and hysteresis becomes greater. The hysteresis of the compounds means the difference between the energy applied to deform a rubber compound, and the energy released as the rubber compound recovers to its initial undeformed state. Tires with lower hysteresis values have reduced rolling resistance and therefore reduce the fuel consumption of the vehicle utilizing the tire.

Thus it would be desirable to develop a carbon black which would impart both improved abrasion resistance and reduced hysteresis to rubber compounds. Tires prepared with such a carbon black would have lower rolling resistance, to improve the fuel economy of the vehicle utilizing the tire, and improved abrasion resistance, to reduce the tread wear of the tire.

One advantage of the present invention is the production of new carbon blacks which impart increased abrasion resistance and reduced hysteresis properties to natural rubbers, synthetic rubbers and blends of natural and synthetic rubbers incorporating the carbon blacks.

Another object of the present invention is new rubber compositions, advantageous for use as passenger car tires, incorporating the new carbon blacks.

Other objects of the present invention will become apparent from the following description and the claims.

SUMMARY OF THE INVENTION

We have discovered a new class of carbon blacks having a CTAB (cetyltrimethylammonium bromide adsorption value) of from about 65 $m^2/g$ (square meters per gram) to about 85 $m^2/g$; a DBP (dibutyl phthlate absorption number) of from about 130 cc/100 g (cubic centimeters per 100 grams) to about 160 cc/100 g, a ratio of CTAB to $I_2$ No. (iodine adsorption number) of from about 1.15 to about 1.35, a $\Delta DBP$ (difference between DBP and Crushed DBP) of from about 20 cc/100 g to about 40 cc/100 g, a Tint value of from about 85 to about 100, a Dmode of from about 115 nm (nanometers=meters$\times 10^{-9}$) to about 135 nm and / $D_{50}$/Dmode ratio of from about 0.65 to about 0.90. We have also discovered a new class of rubber compositions containing these carbon blacks.

Referring to the blacks of the present invention, when the CTAB exceeds about 85 $m^2/g$, the improvement in hysteresis loss is reduced. When the CTAB is below about 65 $m^2/g$ the reinforcing properties of the carbon black are reduced and a good rubber composition cannot be obtained. Similarly, when the DBP of the carbon blacks of the present invention is below about 130 cc/100 g the reinforcing properties of the carbon blacks are unsatisfactory. When DBP exceeds about 160 cc/100 g the modulus of a rubber composition incorporating the carbon black is raised and the stiffness of the rubber composition is increased to disadvantageous levels.

When the difference ($\Delta DBP = DBP - CDBP$) between the DBP and the CDBP (dibutyl phthlate absorption number of the crushed carbon black) exceeds about 40 cc/100 g, the breakage of structure is raised to a point wherein the reinforcing property of the carbon black is disadvantageously reduced. When ΔDBP is below about 20 cc/100 g the dispersibility of the carbon blacks is reduced and the ability of the carbon blacks to be mixed or incorporated into the rubber composition is disadvantageously reduced.

The ratio of CTAB to $I_2$ No. (CTAB/$I_2$No.) is a measure of surface chemical activity. The larger the CTAB/$I_2$NO. ratio, the higher the chemical surface activity. With respect to the carbon blacks of the present invention when the CTAB/$I_2$No. ratio is about 1.15 to about 1.35, it is found that the reinforcing property and hysteresis loss of rubber compounds is improved.

These effects are presumably caused by an interaction between the rubber and carbon black based on the surface chemical activity.

When the Tint value of the carbon blacks of the present invention exceeds about 100 hysteresis loss is disadvantageously increased-to an unacceptable level. When the Tint value is below about 85 the reinforcing properties of the carbon blacks are disadvantageously reduced to an unacceptable level.

When the Dmode of the carbon blacks of the present invention, according to the centrifugal sedimentation method described below, is less than about 115 nm, hysteresis loss is disadvantageously increased to an unacceptable level. When the Dmode is above about 135 nm the reinforcing properties of the carbon blacks are disadvantageously reduced to an unacceptable level.

When the $\Delta D_{50}$/Dmode ratio is less than about 0.65, hysteresis loss is disadvantageously increased to an unacceptable level. When $\Delta D_{50}$/Dmode ratio exceeds 0.90 the reinforcing properties of the carbon blacks are disadvantageously reduced to an unacceptable level.

However, we have discovered that the carbon blacks of the present invention, having analytical properties within the ranges specified, impart improved reinforcing properties and low hysteresis loss to rubber compositions. As explained above, the improved reinforcing properties of the carbon blacks impart improved abrasion resistance to rubber compositions.

The carbon blacks of the present invention may be produced in a furnace carbon black reactor having a first (combustion) zone, and a reaction zone separated by a transition zone, into which all or part of a carbon black yielding feedstock may be injected into a hot combustion gas stream. The carbon black yielding-feedstock is injected radially inwardly into the hot combustion gas stream from the outer periphery of the reactor and also radially outwardly injected from the center portion. The resultant mixture of hot combustion gases and feedstock passes into the reaction zone. A first quench may be used to cool the hot combustion gas stream, without stopping pyrolysis of the feedstock. Pyrolysis, of the carbon black yielding feedstock, is stopped by quenching the mixture when the carbon blacks of the present invention have been formed. Preferably pyrolysis is stopped by a quench injecting a quenching fluid, which in the Examples is water. A reactor suitable for use in producing the carbon blacks of the present invention is described generally in U.S. Pat. No. 3,922,335, the disclosure of which is hereby incorporated by reference. The process for preparing the novel carbon blacks of the present invention will be described in greater detail hereinafter.

The rubbers for which the novel carbon blacks of this invention are effective as reinforcing agents include natural and synthetic rubbers. Generally, amounts of the carbon black product ranging from about 10 to about 250 parts by weight can be used for each 100 parts by weight of rubber in order to impart a significant degree of reinforcement. It is, however, preferred to use amounts varying from about 20 to about 200 parts by weight of carbon black per 100 parts by weight of rubber and especially preferred is the utilization of from about 30 to about 100 parts of carbon black per 100 parts of rubber.

Among the rubbers suitable for use with the present invention are natural rubber and its derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinylpyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and penetene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene.

An advantage of the carbon blacks of the present invention is that the carbon blacks impart increased abrasion resistance and lower hysteresis to compositions containing natural rubbers, synthetic rubbers or blends thereof in which the carbon blacks of the present invention are incorporated.

An advantage of the rubber compositions of the present invention is the that the rubber compositions are particularly well suited for use as passenger car tires.

Other advantages of the present invention will become apparent from the following more detailed description of the invention.

BRIEF DESCRIPTION OF THE DRAWINGS

FIG. 2 is a graph with an example of a Stokes diameter distribution curve.

DETAILED DESCRIPTION OF THE INVENTION

Figure 1:
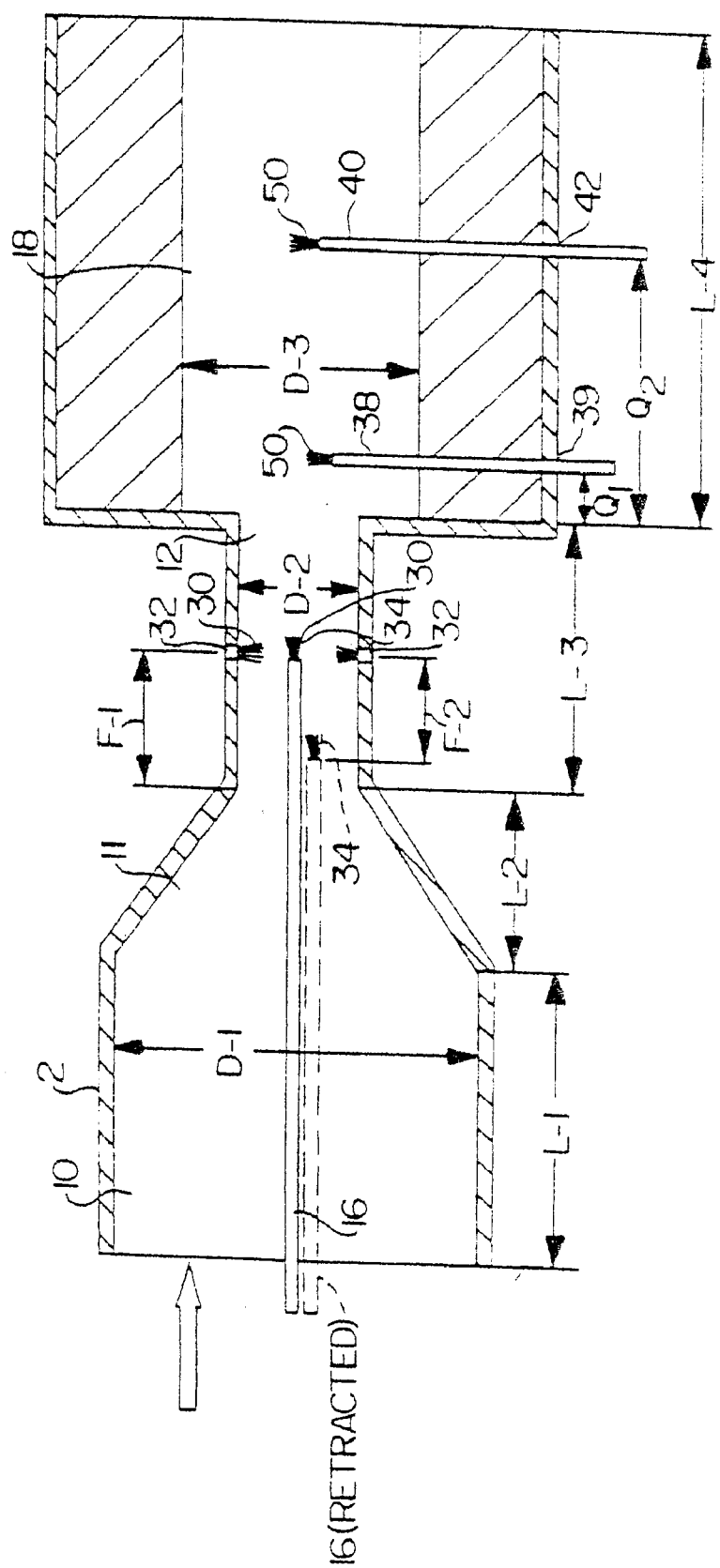
FIG. 1 is a cross-sectional view of a portion of one type of furnace carbon black reactor which may be utilized to produce the carbon blacks of the present invention.

The carbon blacks of the present invention are characterized by having a CTAB of from about 65 m$^2$/g to about 85 m$^2$/g; a DBP of from about 130 cc/100 g to about 160 cc/100g, a CTAB/I$_2$ No. ratio of from about 1.15 to about 1.35, a ΔDBP of from about 20 cc/100 g to about 40 cc/100 g, a Tint value of from about 85 to about 100, a Dmode of from about 115 nm to about 135 nm and ΔD$_{50}$/Dmode ratio of from about 0.65 to about 0.90. We have also discovered a new class of rubber compositions containing these carbon blacks.

The carbon blacks of the present invention may be produced in a modular, also referred to as "staged", furnace carbon black reactor. A section of a typical modular furnace carbon black reactor which may be utilized to produce the carbon blacks of the present invention is depicted in FIG. 1.

Referring to FIG. 1, the carbon blacks of the present invention may be produced in a furnace carbon black reactor 2, having a combustion zone 10, which has a zone of converging diameter 11; transition zone 12; and reaction zone 18. The diameter of the combustion zone, 10, up to the point where the zone of converging diameter, 11, begins is shown as D-1; the diameter of zone 12, as D-2; and the diameter of the reaction zone, 18, as D-3. The length of the combustion zone, 10, up to the point where the zone of converging diameter, 11, begins is shown as L-1; the length of the zone of converging diameter is shown as L-2; the length of the transition zone is shown as L-3; the length of the reaction zone, 18, is shown as L-4. The carbon blacks described in the examples were produced in a reactor where D-1 is 20.7 inches (52.5 centimeters); D-2 is 12.4 inches (31.5 centimeters); D-3 is 18 inches (45.7 centimeters); L-1 is 37.5 inches (95.3 centimeters); L-2 is 29.5 inches (74.9 centimeters); L-3 is 11.5 inches (29.2 centimeters); and L-4 is 48 inches (121.9 centimeters).

To produce the carbon blacks of the present invention hot combustion gases are generated in combustion zone 10 by burning a liquid or gaseous fuel with a suitable oxidant stream such as air, oxygen, mixtures of air and oxygen or the like. Generally the amount of air introduced is between about 15,000 to 18,000 Nm$^3$/Hr. Among the fuels suitable for use in generating the hot combustion gases are included any of the readily combustible gas, vapor or liquid streams such as natural gas, hydrogen, carbon monoxide, methane, acetylene, alcohols, or kerosene. It is generally preferred, however, to utilize fuels having a high content of carbon-containing components and in particular, hydrocarbons. To facilitate the generation of hot combustion gases, the oxidant stream may be preheated such as to a temperature between 5000° C. and 900° C.

The hot combustion gas stream flows downstream from zones 10 and 11 into zones 12 and then 18. The direction of the flow of hot combustion gases is shown in the figure by the arrow. Carbon black-yielding feedstock, 30, is introduced both at point 32 (located in zone 12) and simultaneously through probe, 16, at point 34. Generally the amount of feedstock introduced is between about 4200 and 4500 lph (liters per hour). The distance from the end of the zone of converging diameter to point 32, is shown as F-1. The distance from point 32 upstream to point 34, is shown as F-2. To produce the carbon blacks of the present invention, the feedstock may be injected in an amount of from about 80% to about 40% by weight, at point 32, and the remainder of the total amount of from about 20% to about 60% by weight, injected at point 34. Preferably from about 75% to about 60% of the total amount of feedstock, by weight, is introduced at point 32, and the remainder of the total amount of feedstock, from about 25% to about 40% by weight, is introduced at point 34. In the examples described herein carbon black-yielding feedstock, 30, was injected in the form of a plurality of jets which penetrate into the interior regions of the hot combustion gas stream to insure a high rate of mixing and shearing of the hot combustion gases and the carbon black-yielding feedstock so as to rapidly and completely decompose and convert the feedstock to the novel carbon blacks of the present invention.

The mixture of carbon black-yielding feedstock and hot combustion gases flows downstream through zone 12 into reaction zone 18. A first quench 38, located at point 39, injecting water 50 may be utilized to cool the feedstock without stopping pyrolysis. The distance from the beginning of zone 18 to Quench 38, is shown as Q$_1$. Quench 40, located at point 42, injecting water 50, is utilized to stop pyrolysis of the carbon black-yielding feedstock when the novel carbon blacks of the present invention are formed. Point 42 may be determined in any manner known to the art, for selecting the position of a quench to stop pyrolysis. One method for determining the position of the quench to stop pyrolysis is by determining the point at which an acceptable toluene extract level for the novel carbon blacks of the present invention is achieved. Toluene extract level may be measured by using ASTM Test D1618-83 "Carbon Black Extractables—Toluene Discoloration". Q$_2$ is the distance from the beginning of zone 18 to quench point 42, and will vary according to the position of the quench.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

The following testing procedures are used in the determination and evaluation of the analytical properties of the carbon blacks of the present invention, and the physical properties of the rubber compositions incorporating the carbon blacks of the present invention.

Iodine adsorption number of the carbon blacks (I$_2$No.) was determined according to JIS K6221-1982. CTAB surface area (cetyltrimethylammonium bromide adsorption) was determined according to ASTM D3765-85. The DBP (Dibutyl Phthalate absorption value) of the carbon black pellets was determined according to the procedure set forth in JIS K6221-1982. The CDBP (Crushed DBP) was determined according to the procedure set forth in ASTM D 3493.

Δ D 50 and Dmode of the carbon blacks was determined in the following manner. A histogram is made of the Stokes diameter of the aggregates of the carbon black sample versus the relative frequency of their occurrence in a given sample.

As shown in FIG. 2, a line (B) is drawn from the peak (A) of the histogram in a direction parallel to the Y axis, to and ending at the X-axis at point (C) of the histogram. The midpoint (F) of the resultant line (B) is determined and a line (G) is drawn through the midpoint (F) thereof parallel to the X-axis. Line (G) intersects the distribution curve of the histogram at two points D and E. The absolute value of the difference of the two Stokes diameters of the carbon black particles at points D and E is the ΔD 50 value. The data used to generate the histogram are determined by the use of a disk centrifuge such as the one manufactured by Joyce Loebl Co. Ltd. of Tyne and Wear, United Kingdom. The following procedure is a modification of the procedure described in the instruction manual of the Joyce Loebl disk centrifuge file reference DCF 4.008 published on Feb. 1, 1985, the teachings of which are hereby incorporated by reference, and was used in determining the data.

The procedure is as follows. 10 mg (milligrams) of a carbon black sample are weighed in a weighing vessel, then added to 50 cc of a solution of 10% absolute ethanol and 90% distilled water which is made 0.05% NONIDET P-40 surfactant (NONIDET P-40 is a registered trademark for a surfactant manufactured and sold by Shell Chemical Co.). The resulting suspension is dispersed by means of ultrasonic energy for 15 minutes using Sonifier Model No. W 385, manufactured and sold by Heat Systems Ultrasonics Inc., Farmingdale, N.Y.

Prior to the disk centrifuge run the following data are entered into the computer which records the data from the disk centrifuge:

1. The specific gravity of carbon black, taken as 1.86 g/cc;
2. The volume of the solution of the carbon black dispersed in a solution of water and ethanol, which in this instance is 0.5 cc.;
3. The volume of spin fluid, which in this instance is 10 cc of water;
4. The viscosity of the spin fluid, which in this instance is taken as 0.933 centipoise at 23 degrees C.;
5. The density of the spin fluid, which in this instance is 0.9975 g/cc at 23 degrees C.;
6. The disk speed, which in this instance is 8000 rpm;
7. The data sampling interval, which in this instance is 1 second.

The disk centrifuge is operated at 8000 rpm while the stroboscope is operating. 10 cc of distilled water are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disk and data collection is started immediately. If streaming occurs the run is aborted. The disk is spun for 20 minutes following the injection of the dispersed carbon black in aqueous ethanol solution. Following the 20 minutes of spinning, the disk is stopped, the temperature of the spin fluid is measured, and the average of the temperature of the spin fluid measured at the beginning of the run and the temperature of the spin fluid measured at the end of the run is entered into the computer which records the data from the disk centrifuge. The data is analyzed according to the standard Stokes equation and is presented using the following definitions:

Carbon black aggregate—a discrete, rigid colloidal entity that is the smallest dispersible unit; it is composed of extensively coalesced particles;

Stokes diameter—the diameter of a sphere which sediments in a viscous medium in a centrifugal or gravitational field according to the Stokes equation. A non-spherical object, such as a carbon black aggregate, may also be represented in terms of the Stokes diameter if it is considered as behaving as a smooth, rigid sphere of the same density and rate of sedimentation as the non-spherical object. The customary units are expressed in nanometer diameters.

Mode (Dmode for reporting purposes)—The Stokes diameter at the point of the peak (Point A of FIG. 2 herein) of the distribution curve of Stokes diameter.

Median Stokes diameter—(Dst for reporting purposes) the point on the distribution curve of Stokes diameter where 50% by weight of the sample is either larger or smaller (Point H of FIG. 2 herein). It therefore represents the median value of the determination.

The abrasion data of the rubber compositions were determined using a Lambourn abrader. The test pieces had an outer diameter of 54.0 mm and a thickness of 12.7 mm. The emery wheel had an abrasive grain of C type, a grain size of #80 and a binding degree of K. The relative slip ratio between the Emery wheel surface and the test piece was 25%. The test load was 12 kg. 10 g/min of carborundum grain, grain size #100, was added. In the following examples, the abrasion index is the ratio of the abrasion rate of a control composition containing IRB #6 carbon black, divided by the abrasion rate of a composition produced using a specified carbon black of the present invention at the same slip.

The modulus, tensile and elongation of the rubber compositions were measured by the procedure set forth in ASTM D 412.

The effectiveness and advantages of the present invention will be further illustrated by the following examples.

EXAMPLE 1

An example of the novel carbon blacks of the present invention was prepared in a carbon black production run, in a reactor generally described herein, and as depicted in FIG. 1, utilizing the reactor conditions and geometry set forth in Table 2. The properties of the fuel oil utilized in the combustion reaction in each example, and the properties of the feedstock utilized in each example are shown in Table 1 below:

TABLE 1

|  | Fuel Oil | Feedstock Oil |
| --- | --- | --- |
| Hydrogen/Carbon Ratio | 1.21 | 0.76 |
| Hydrogen (wt. %) | 9.22 | 5.89 |
| Carbon (wt. %) | 90.64 | 92.06 |
| Sulfur (wt. %) | 0.03 | 0.50 |
| BMCI (Visc-Grav) | 40 | 148 |
| A.P.I. Gravity | 22.30 | −4.59 |
| 15.5/15.6 C(60)F [ASTM D-287] |  |  |
| Specific Gravity | 0.920 | 1.115 |

TABLE 1-continued

| | Fuel Oil | Feedstock Oil |
|---|---|---|
| 15.5/15.6 C(60)F [ASTM D-287] | | |
| Viscosity, SUS (130° F.) [ASTM D-88] | 40 | 50 |
| Viscosity, SUS (210° F.) [ASTM D-88] | 33 | 40 |

TABLE 2

| | EXAMPLE 1 CARBON BLACK |
|---|---|
| D-1, in. | 20.7 |
| D-2, in. | 12.4 |
| D-3, in. | 18.0 |
| L-1, in. | 37.5 |
| L-2, in. | 29.5 |
| L-3, in. | 11.5 |
| L-4, in. | 48.0 |
| F-1, in. | 5.75 |
| F-2, in. | 18 |
| Q1, ft. | 6 |
| Q2, ft. | 34 |
| Oil Inj. Pt. 32, ) Tips # × Size, in.) | 6 × 0.089 |
| Oil Rate Pt. 32, 1 ph | 2500 |
| Oil Press. Pt. 32, kg/cm² | 10.5 |
| Oil Preheat Pt. 32, ° C. | 120 ± 10 |
| Oil Inj. Pt. 34, ) Tips # × Size, in.) | 6 × 0.089 |
| Oil Rate Pt. 34, 1 ph | 2050 |
| Oil Press. Pt. 34, kg/cm² | 10.5 |
| Oil Preheat Pt. 34, ° C. | 120 ± 10 |
| Comb. Air, kscfh | 460 |
| Comb. Air Preheat, ° C. | 670 |
| Fuel, kg/hr | 801 |
| Excess Air Rate % | 160 |
| Air to Burn Ratio kscf/gal. | 1.34 |
| Potassium, ppm | 0.5 |
| Quench 1 Press., kg/cm² | 17 |

Inj. = Injection
Comb. = combustion
Press. = pressure
Pt. 32 = Point 32 on FIG. 1
Pt. 34 = Point 34 on FIG. 1
1 ph = liters per hour
kg/cm² = kilograms per square centimeter
kscfh = standard cubic feet per hour, in thousands
ft = feet
in = inch
° C. = degrees Celsius The carbon black produced was then analyzed according to the procedures described herein. The analytical properties of the carbon, as well as an IRB #6 reference carbon black sample, and two comparative example carbon blacks, were as shown in Table 3:

TABLE 3

| | Carbon Blacks | | | |
|---|---|---|---|---|
| | Ex 1 | C.E. 1 | C.E. 2 | IRB #6 |
| CTAB (m²/g) | 73 | 85 | 74 | 78 |
| I₂ No. (mg/g) | 61 | 66 | 68 | 80 |
| CTAB/I₂ No. | 1.20 | 1.29 | 1.09 | 0.98 |
| DBP (cc/100 g) | 139 | 128 | 128 | 100 |
| CDBP (cc/100 g) | 108 | 109 | 98 | 87 |
| ΔDBP (cc/100 g) | 31 | 19 | 30 | 13 |
| Tint (%) | 93 | 97 | 95 | 100 |
| Dmode (nm) | 124 | 122 | 120 | 110 |
| ΔD50 (nm) | 82 | 104 | 69 | 76 |
| ΔD50/Dmode | 0.66 | 0.85 | 0.58 | 0.69 |

C.E. - comparative example carbon black

EXAMPLE 2

This Example illustrates the use of the novel carbon blacks of the present invention in a natural rubber composition.

Natural rubber compositions incorporating the novel carbon black of the present invention prepared in Example 1, the comparative carbon blacks C.E. 1 and C.E. 2 of Example 1 and IRB #6 were prepared according to the following recipe.

| NATURAL RUBBER FORMULATION (ASTM D-3192) | |
|---|---|
| Ingredient | Parts By Weight |
| Natural Rubber | 100 |
| Carbon Black | 50 |
| Zinc Oxide | 5 |
| Stearic Acid | 3 |
| Accelerator MBTS | 0.6 |
| Sulfur | 2.5 |

MBTS = mercaptobenzothiazolesulfenamide

Each of the natural rubber compositions was cured at 145° C. for 30 minutes.

Natural rubber composition A was prepared with the carbon black of Example 1. Natural rubber composition B was prepared with comparative example carbon black 1 (C.E. 1). Natural rubber composition C was prepared with comparative example carbon black 2 (C.E. 2). Natural rubber composition D was prepared with IRB #6 carbon black.

The static properties of the natural rubber compositions were then evaluated according to the ASTM procedures described herein. The results were as shown in Table 4:

TABLE 4

| Natural Rubber Composition | Modulus 300% E1* Kgf/cm² | Tensile Strength Kgf/cm² | E1$_b$* % | Rebound % | Abrasion Index % |
|---|---|---|---|---|---|
| A (Ex. 1) | 153 | 211 | 410 | 57.6 | 117 |
| B (C.E. 1) | 139 | 204 | 420 | 53.5 | 111 |
| C (C.E. 2) | 135 | 207 | 410 | 53.6 | 108 |
| D (IRB #6) | 105 | 212 | 510 | 52.0 | 100 |

*E1 = elongation
E1$_b$ = elongation at break

These results show that the abrasion resistance of the natural rubber compositions produced with the carbon blacks of the present invention was higher than the abrasion resistance of the IRB #6 carbon black and the comparative example carbon blacks. Therefore, tires produced with the carbon blacks of the present invention will have longer tread life than tires produced with the IRB# 6 blacks. Further, the rebound value of the rubber compositions produced with the carbon blacks of the present invention is higher, therefore the hysteresis loss is lower for these compositions. Thus, vehicles utilizing tires produced with the carbon blacks of the present invention will achieve better gas mileage than vehicles utilizing tires produced with the IRB #6 black and comparative example blacks.

EXAMPLE 5

This Example illustrates the use of the novel carbon blacks of the present invention in synthetic rubber compositions. Synthetic rubber compositions incorporating the novel carbon black of the present invention prepared in Example 1, comparative example carbon blacks C.E.1 and C.E.2 of Example 1 and IRB #6 were prepared according to the following ASTM D3191 recipe:

| SYNTHETIC RUBBER (ASTM D3191) | |
| --- | --- |
| Ingredient | Parts By Weight |
| SBR-1500 rubber | 100 |
| Carbon Black | 50.00 |
| Zinc Oxide | 3.00 |
| Stearic Acid | 1.00 |
| Sulfur | 1.75 |
| TBBS | 1.00 |

SBR = styrene butadiene rubber
TBBS = N-tert-butyl-2-benzothiazole sulfenamide

Each of the synthetic rubber compositions was cured at 145° C. for 30 minutes.

Synthetic rubber composition E was prepared with the carbon black of Example 1. Synthetic rubber composition F was prepared with comparative example carbon black 1 (C.E. 1). Synthetic rubber composition G was prepared with comparative example carbon black 2 (C.E. 2). Synthetic rubber composition H was prepared with the reference IRB #6 carbon black.

The static properties of the synthetic rubber compositions were then evaluated according to the ASTM procedures described herein. The results were as follows:

| Synthetic Rubber Composition | Modulus 300% $E1$* Kgf/cm$^2$ | Tensile Strength Kgf/cm$^2$ | $E1_b$* % | Rebound % | Abrasion Index, % |
| --- | --- | --- | --- | --- | --- |
| E (Ex. 1) | 197 | 271 | 400 | 54.1 | 106 |
| F (C.E. 1) | 180 | 260 | 400 | 51.8 | 100 |
| G (C.E. 2) | 178 | 263 | 420 | 52.0 | 102 |
| H (IRB #6) | 133 | 256 | 500 | 49.5 | 100 |

*$E1$ = elongation
$E1_b$ = elongation at break

These results show that the abrasion index for the rubber compositions produced with the carbon blacks of the present invention is higher than that of the rubber compositions produced with the IRB #6 black and the comparative carbon blackst. Therefore, tires produced with the carbon blacks of the present invention will have longer tread life than tires produced with the IRB #6 black and the comparative carbon blacks. Further, the rebound value of the rubber composition produced with the carbon blacks of the present invention is higher, therefore the hysteresis loss is lower for these compositions. Thus, vehicles utilizing tires produced with the carbon blacks of the present invention will achieve better gas mileage than vehicles utilizing tires produced with the IRB #6 black and the comparative carbon blacks.

It should be clearly understood that the forms of the present invention herein described are illustrative only and are not intended to limit the scope of the invention. The present invention includes all modifications falling within the scope of the following claims.

What is claimed is:

1. Carbon blacks having a CTAB of from about 65 m$^2$/g to about −85 m$^2$/g, a DBP of from about 139 cc/100 g to about 160 cc/100 g, a CTAB/I$_2$ No. ratio of from about 1.15 to about 1.35, a ΔDBP of from about 20 cc/100 g to about 40 cc/100 g, a tint value of from about 85 to about 100, a Dmode of from about 115 nm to about 135 nm, a ΔD$_{50}$/Dmode ratio of from about 0.65 to about 0.90, and a ΔTint value of about 2.5.

2. A rubber composition comprising about 100 parts, by weight, of a rubber and from about 10 to about 250 parts, by weight, of a carbon black having a CTAB of from about 65 m$^2$/g to about 85 m$^2$/g, a DBP of from about 139 cc/100 g to about 160 cc/100 g, a CTAB/I$_2$ No. ratio of from about 1.15 to about 1.35, a ΔDBP of from about 20 cc/100 g to about 40 cc/100 g, a Tint value of from about 85 to about 100, a Dmode of from about 115 nm to about 135 nm, a ΔD$_{50}$/Dmode ratio of from about 0.65 to about 0.90, and a ΔTint value of about 2.5.

* * * * *